(No Model.)

E. H. ANGLE.
TOOTH REGULATOR.

No. 415,829. Patented Nov. 26, 1889.

Witnesses.
J. Jessen.
H. Johanning.

Inventor.
Edward H. Angle
By
Paul & Merwin.
Att'ys

UNITED STATES PATENT OFFICE.

EDWARD H. ANGLE, OF MINNEAPOLIS, MINNESOTA.

TOOTH-REGULATOR.

SPECIFICATION forming part of Letters Patent No. 415,829, dated November 26, 1889.

Application filed June 27, 1889. Serial No. 315,832. (No model.)

*To all whom it may concern:*

Be it known that I, EDWARD H. ANGLE, of Minneapolis, in the county of Hennepin and State of Minnesota, have invented certain new and useful Improvements in Means for Changing Protruding and Malposed Teeth into a more Proper and Regular Position, of which the following, with its accompanying drawings, is a specification.

My invention relates to devices used in treating undue prominence of the upper or lower teeth, whereby they are compressed into their sockets or forced backward into line or into a more regular position; and it consists, generally, in the construction and combination hereinafter described, and particularly pointed out in the claims.

While other appliances have been used to accomplish similar results, my improvement has great superiority over them in various respects—in simplicity, in cleanliness, in comfort to the patient, and especially in its effectiveness by automatically taking up and retaining whatever advantage is gained from time to time in change of position of the teeth by the combined operation of all the appliances herein described, and more particularly in retaining this advantage while a part of the said appliances are not in operation, it being the intention to constantly wear through the treatment this particular part of the appliances, which takes up and retains the movement of the teeth accomplished, thereby preventing the teeth from springing back or returning to their old position, whereby much more effective, rapid, and remedial work is accomplished than by any other method.

Another advantage claimed by me for this particular part of my appliances, which holds and retains the advantages gained in the movement of the teeth, as above described, is that after the work sought to be performed is satisfactorily accomplished it may be constantly worn until the teeth operated upon are firmly grown and fixed in their new position.

Another important advantage claimed by me over all other devices is that any unequal pressure or accidental blow or shock upon the traction-bar herein described will not affect unpleasantly the teeth being operated upon, on account of its being diminished in its effect by reason of the free movement provided for where the standard herein described, with its forks or ball-and-socket joint, rests upon the wire arch herein described.

Figure 1:
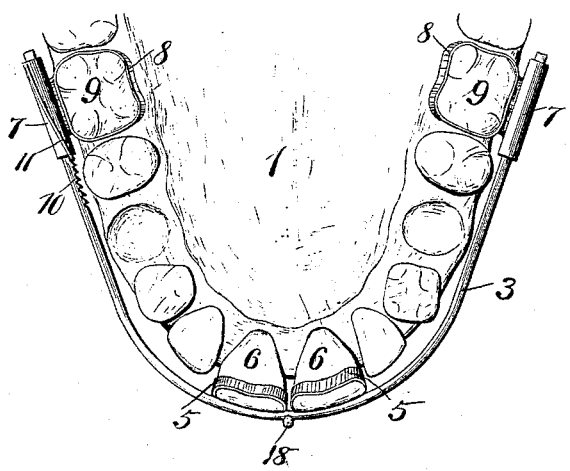
Figure 2:
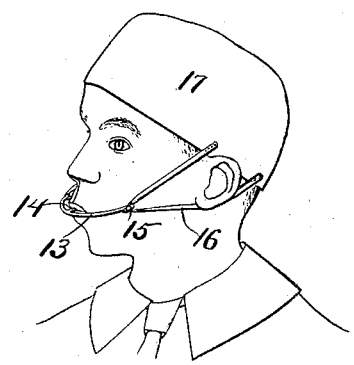
Figure 4:
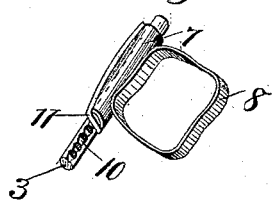
Figure 6:
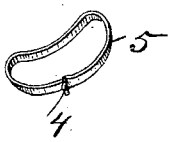
Figure 3:
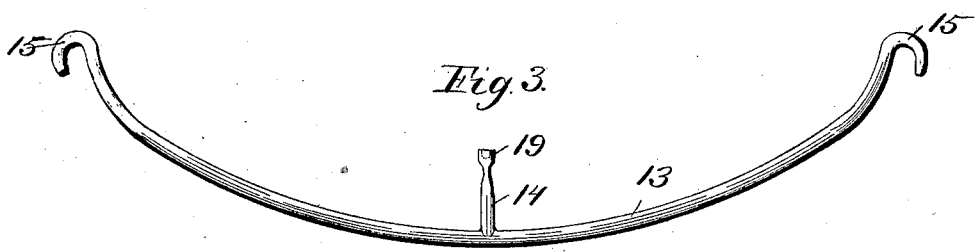
Figure 5:
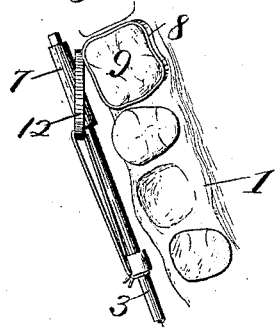
Figure 7:

Figure 1 is a plan view of a part of the upper jaw and its included teeth with my device applied thereto, showing manner of securing the same to the teeth, also showing the wire arch and the rack and dog attached to the same. Fig. 5 is a detail of part of a modified form of the wire arch and its attachments, showing how rubber bands may be used in place of the rack and dog. Fig. 2 is a side view of the head of the patient, showing the traction-bar in position and connected by elastic bands to the occipital bandage, also showing the position of the standard which conveys the pressure from the traction-bar to the wire arch. Fig. 3 is a detail of the traction-bar, showing the socket of a ball-and-socket joint on the standard. Fig. 4 is a detail of the rack and dog attachment of the wire arch. Figs. 6 and 7 are other details.

In the drawings, 1 represents the upper jaw, supplied with teeth, the central incisors 6 being unduly prominent.

3 represents the wire arch, which is made so as to conform as nearly as possible in its shape to a perfect or ideal dental arch.

When the pressure is applied to the wire arch, it can and generally does act or press upon more than one tooth at a time, forcing the teeth acted upon into more regular positions, and frequently, by the pressure of one tooth upon another, indirectly pressing the other teeth into regular positions. The effect of the pressure of the wire arch used in this manner is to directly and indirectly, as above described, force the teeth into regular positions conforming to the curvilinear shape of the wire arch 3. The direction of the pressure of the wire arch 3 may be backward or upward, as the standard on the traction-bar herein described is adjusted and held by the rubber bands attached to the occipital bandage.

The wire arch 3 is held in place near its center by resting in the grooves or notches 4 of the metal bands 5, which encircle the central incisors 6 or other suitable teeth. It is also held in place at each end by passing through the cylinders or tubes 7, which are rigidly attached to the bands encircling the first molars 9 or other suitable teeth. Near each end of said wire arch 3 is a rack 10, formed upon said wire arch 3, which the spring-dog 11 engages, by means of which whatever advantage is gained in the movement of the teeth into regular position by the pressure applied is retained by the rack 10 and the dog 11, as the wire 13 is forced back through the cylinders or tubes 7, so that the teeth are prevented from springing back or returning to their former positions when the pressure is removed by the taking off of the traction-bar herein described. Said wire arch 3 and all its attachments securing it to the teeth are worn continually by the patient until the operation is completed. In place of the rack 10 and dog 11, the same advantage of retaining the change in the position of the teeth may be accomplished by the elastic rubber band 12, one end of which is secured to the inner end of the tube 7 or to the band 8, and the other end secured to the wire arch 3, forward of the tube 7, as shown in detail, Fig. 5.

13 is a traction-bar formed, preferably, of spring-wire, and curved to conform to the contour of the face of the patient, and is arranged upon the wire arch 3 by means of the standard 14, projecting from the center of the inner side of the traction-bar 13, having the socket 19, which engages the ball 18 of the arch, forming a ball-and-socket joint.

At each end of the traction-bar 13 is arranged a hook or loop 15, to which elastic bands 16 are attached, the other ends of the bands being secured to the occipital bandage 17, which passes around the back of the head of the patient, whereby a constant elastic and powerful pressure is exerted upon the wire arch 3, and through it to the teeth operated upon.

On account of the free movement provided for by the ball-and-socket joint between the standard 14 and the wire arch 3, the force of any accidental pressure or blow or shock is diminished to such an extent as not to affect the teeth unpleasantly. Different directions of pressure, either backward or upward, may be easily given to the traction-bar by reason of the free movement in the ball-and-socket joint by changing the position of the elastic bands 16 upon the head of the patient. The occipital bandage, the traction-bar, and the elastic bands connecting the same are to be worn principally at night, although they can be worn at other times, if desired.

Fig. 7 shows a modified form of the traction-bar, having a forked standard 21, which directly engages the wire arch instead of the ball-and-socket joint.

I claim—

1. In a device of the class described, the combination of the arch 3, the bands 8, having the tubes 7, adapted to receive the ends of the arch 3, and mechanism automatically engaging with said arch 3 and adapted to take up the backward movement of said arch through said tubes, and thus to secure it in any desired position therein, substantially as described.

2. Means for correcting the irregularities of position of teeth, comprising a wire adapted to encircle the dental arch and to bear upon the protruding teeth, elastic attachments secured to said wire and extending around the head of the patient, whereby elastic pressure is exerted upon said teeth, and suitable mechanism engaging with said wire and adapted to automatically take up the yielding motion of said teeth and retain them in their changed position, combined and adapted to operate substantially as described.

3. In a device of the class described, the combination of bands adapted to engage the rear teeth, and a movable arch adapted to extend around the teeth of the dental arch, and having automatic mechanism, substantially as described, adapted to connect said arch to said bands and to secure the same in any desired position, substantially as described.

4. In a device of the class described, the combination, with a spring wire arch adapted to surround the teeth of the dental arch and to bear upon the same, bands surrounding rear teeth in the jaw and provided with tubes to receive the ends of said wire arch, a rack arranged upon the wire arch near each extremity, and a spring-dog adapted to engage said rack and automatically to secure said wire arch in any desired position, substantially as and for the purposes set forth.

5. The combination, in a device of the class described, of an arch adapted to apply pressure to the teeth and provided with one member of a ball-and-socket joint, and a traction-bar provided with the other member of a ball-and-socket joint and adapted to engage said arch, for the purposes set forth.

6. Means for correcting the irregularities of the position of teeth, comprising a wire adapted to embrace the dental arch and to bear upon the protruding teeth, and suitable mechanism secured to teeth posterior to the protruding teeth, engaging with said wire and adapted to automatically take up the backward movement of said wire and retain it in its changed position, combined and adapted to be operated substantially as described.

7. In a device of the class described, the combination of an artificial arch adapted to bear upon protruding teeth in the dental arch, a traction-bar engaging said artificial arch, and means for applying tension to said bar, substantially as and for the purpose set forth.

In testimony whereof I have hereunto set my hand this 14th day of June, 1889.

EDWARD H. ANGLE.

In presence of—
A. C. PAUL,
B. BOOTH.